United States Patent [19]

Hilverdink

[11] Patent Number: 4,784,181

[45] Date of Patent: Nov. 15, 1988

[54] EXPANSION TANK WITH A BLADDER-TYPE DIAPHRAGM

[75] Inventor: Johan Hilverdink, Maarn, Netherlands

[73] Assignee: Flamco B.V., Gouda, Netherlands

[21] Appl. No.: 111,135

[22] Filed: Oct. 19, 1987

Related U.S. Application Data

[63] Continuation of Ser. No. 914,792, Oct. 2, 1986, abandoned.

[30] Foreign Application Priority Data

Oct. 7, 1985 [NL] Netherlands ............... 8502736

[51] Int. Cl.⁴ ............................ F16L 55/04
[52] U.S. Cl. ........................ 138/30; 220/85 B
[58] Field of Search ................ 138/26, 30, 31; 220/85 B

[56] References Cited

U.S. PATENT DOCUMENTS

| | | | |
|---|---|---|---|
| 2,299,611 | 10/1942 | Clark | 138/30 |
| 2,378,467 | 6/1945 | de Kiss | |
| 2,397,248 | 3/1946 | de Kiss | |
| 2,421,076 | 5/1947 | Linton | |
| 2,465,908 | 3/1949 | Mercier | |
| 2,737,453 | 3/1956 | Larsen | 220/85 B |
| 3,028,040 | 9/1962 | Woodard et al. | 220/85 B |
| 3,197,087 | 7/1965 | Black | 138/30 |
| 3,236,411 | 2/1966 | Lander et al. | 138/30 |
| 3,506,037 | 4/1970 | Hanson et al. | |
| 3,931,834 | 1/1976 | Caillet | 138/30 |
| 4,254,887 | 3/1981 | Bold | 220/85 B |
| 4,474,215 | 10/1984 | Richter et al. | 138/30 |

FOREIGN PATENT DOCUMENTS 1447976  6/1966  France .

*Primary Examiner*—James E. Bryant, III
*Attorney, Agent, or Firm*—Watson, Cole, Grindle & Watson

[57] ABSTRACT

In an expansion tank with a bladder-type diaphragm inside the tank, the diaphragm is provided on the outside with an annular open-holding element fixed to the diaphragm. The annular open-holding element may be positioned between two inwardly extending ribs disposed on the inside wall of the expansion tank. The ribs lie at distance from each other and extend preferably essentially perpendicular to the center line of the tank. The bladder-type diaphragm is preferably made up of two parts being attached to each other with their edges by means of an open-holding ring with a U-shaped cross-section. The edges of the diaphragm parts are accommodated in the U-shape and clamped together by the legs thereof. In the collapsed state the shape of the diaphragm can be controlled so that an optimal shape as regards the strain in the material of the diaphragm is obtained.

4 Claims, 2 Drawing Sheets

EXPANSION TANK WITH A BLADDER-TYPE DIAPHRAGM

This application is a continuation of application Ser. No. 914,792 filed Oct. 2, 1986, now abandoned.

BACKGROUND OF THE INVENTION

1. Field of the Invention

The invention relates to an expansion tank provided with a bladder-type diaphragm fitted in the inside of the tank.

2. The Prior Art

Expansion tank of the noted type are known. They comprise in general an essentially cylindrical or spherical housing containing a bladder-shaped elastic diaphragm which serves as the division between a liquid and a pressurized gas. Disposed in the wall of the housing is a connection aperture for connection to a system in which there is a quantity of liquid which is subject to volume changes, e.g., a water pipe system or a hot water supply system. The diaphragm is connected at the connection aperture to the housing and is provided with an opening, so that the inside of the bladder-type diaphragm can be connected with the interior of the system with the liquid. The connection aperture is generally disposed on the centre line of the expansion tank. During use, the liquid is in the diaphragm, while the pressurized gas is in the space between the diaphragm and the housing. This gas can be fed via a connecting nipple into this space. The diaphragm is generally connected also to the housing at the side opposite the connection aperture.

The known expansion tank has the disadvantage that in the vent the volume of the liquid in the liquid system decreases to such an extent that all or practically all liquid present in the diaphragm is driven under the influence of the gas pressure into the liquid system, the diaphragm is pressed together in more or less uncontrolled fashion and, if worst comes to the worst, can even be crumpled together. This has a very adverse effect on the service life of the diaphragm.

SUMMARY OF THE INVENTION

The object of the invention is to eliminate the above-mentioned disadvantage.

This object is achieved by an expansion tank of the above-mentioned type which is characterized in that the diaphragm is provided on the outside with at least one open-holding element fixed to the diaphragm.

By this means it is possible to keep certain parts of the diaphragm always at a certain distance from each other while the diaphragm is draining, the result being that the other parts are forced to follow a predetermined path or movement. As such, the diaphragm in a collapsed state obtains an advantageous shape as regards the strain in the material of the diaphragm.

The open-holding element is preferably in the form of a rigid ring.

With an annular open-holding element, great rigidity can be obtained with relatively little material. It is advantageous for the plane of the annular open-holding element to be perpendicular to the centre line of the expansion tank, so that the freely movable part of the diaphragm which lies opposite the connection aperture is forced to move essentially in the axial direction of the tank, i.e., during drainage of the diaphragm in the direction of the connection aperture.

In an expedient embodiment of the expansion tank, the annular open-holding element is positioned in the axial direction between inward-extending projections which are disposed on the inside wall of the expansion tank and which are essentially lying in two planes which are at a distance from each other and are essentially perpendicular to the centre line of the tank, and the projections are preferably formed by two circumferential ribs which are at a distance form each other on the inside wall of the tank.

The deformation possibilities of the diaphragm are thereby still further limited, so that the shape which the diaphragm will assume when collapsed can be controlled in optimum fashion.

In a very advantageous embodiment of the expansion tank according to the invention, the bladder-type diaphragm is made up of two or more parts, the parts being attached to each other with their edges, and an open-holding element is fitted at the connecting seam(s).

The manufacture of such a diaphragm is considerably simpler than the manufacture of a one-piece bladder-type diaphragm, in particular if the connection aperture is small. Besides, such a diaphragm in itself already has a tendency to deform in a direction perpendicular to the plane of the connecting seam. Moreover, the open-holding element is simple to fit.

In a practical embodiment the open-holding element is in the form of a ring with an essentially U-shaped cross section, with both legs of the U-shape being directed inwards, and with the edges of the connecting parts of the diaphragm being accomodated in the U-shape and clamped together by the legs thereof. The distance between the legs of the U-shape can be smaller in the direction of the free ends thereof.

The invention will now be explained with reference to an example of an embodiment shown in the drawings.

DETAILED DESCRIPTION OF THE PREFERRED EMBODIMENTS

Figure 1:
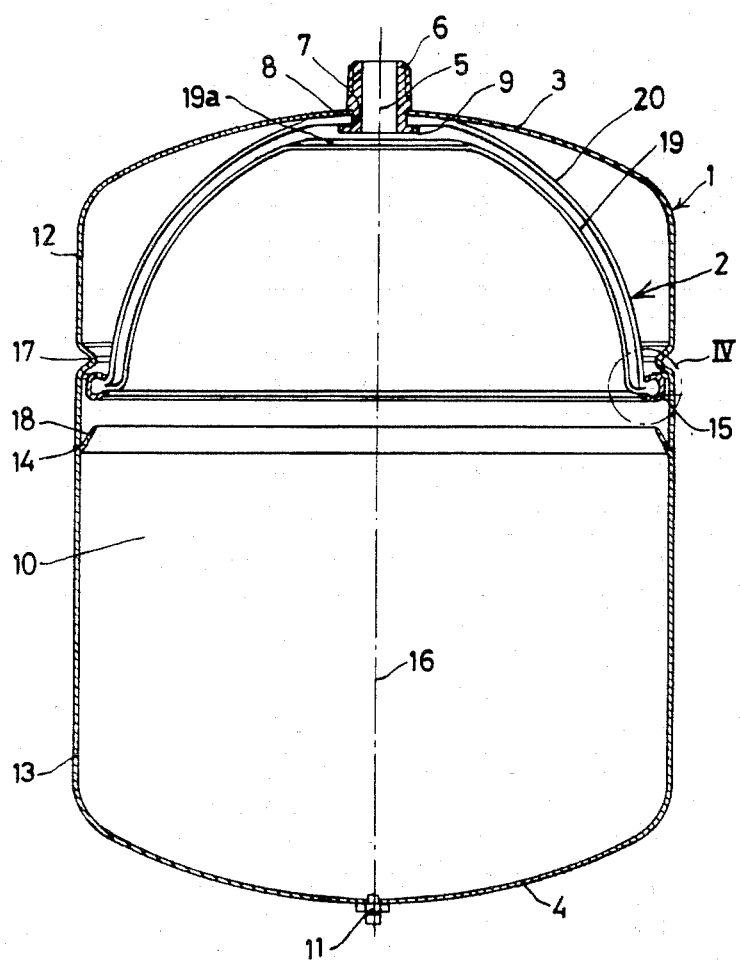
FIG. 1 is a cross section of an expansion tank according to the invention, where the diaphragm is in the virtually completely collapsed position.

The expansion tank shown in FIG. 1 comprises a housing 1 and disposed therein is a bladder-type elastic diaphragm 2. The housing is essentially cylindrical and is provided with two bottoms 3 and 4. Disposed in the bottom 3 is a connection aperture 5 in which a connecting nipple 6 is fitted. The diaphragm is also provided with an opening (mouth) 7. The edge 8 of this opening is clamped at the connection aperture 5 between the bottom 3 and a radially extending edge 9 of the nipple 6, as a result of which the diaphragm 2 is connected to the housing 1.

Via the connecting nipple 6 the expansion tank can be connected to the system in which there is a quantity of liquid which is subject to volume change, e.g., a water pipe system or a hot water supply system. The inside of the diaphragm can be connected via the channel in the connecting nipple 6 with the inside of the above-mentioned system.

In the space 10 between the diaphragm 2 and the housing 1 there is pressurized gas which can be conveyed into the expansion tank via a nipple 11.

The housing 1 of the expansion tank is made up of two parts 12 and 13, which are welded together at 14.

The diaphragm 2 is provided on the outside with an open-holding element 15 in the form of a rigid ring fixed to the diaphragm. The ring 15 lies in a plane which is essentially perpendicular to the centre line 16 of the expansion tank. The ring is situated between two circumferential ribs 17 and 18 which are fitted at a distance from each other, which limits the possible movement of the ring in the axial direction. The limitation of the movement by the rib 18 is important to prevent uncontrolled pulling forces on the edge 8.

The rib 17 is formed by a circumferential inward projection in the top part 12 of the housing 1, and the rib 18 is formed by the inward-bent end part of the bottom part 13 of the housing. The imaginary planes in which the ribs 17 and 18 are situated are essentially perpendicular to the centre line of the expansion tank.

Through the above-mentioned measures, the diaphragm 2 is held at the ring 15 in a round shape determined by the ring 15, and the freely movable part 19 of the diaphragm, i.e., the part of the diaphragm which is only bounded by the ring and which is situated opposite the connection aperture 5, can move essentially only in the axial direction of the expansion tank. This means that the diaphragm is not pressed together in uncontrolled fashion during drainage, and in the collapsed state it takes up more or less the shape shown in FIG. 1, which is advantageous for the service life of the diaphragm.

In order to prevent the diaphragm 2 from fully closing the connection aperture 5 in this state, the diaphragm is provided on the inside, at the point opposite the connection aperture, with a number of upright ribs 19a, between which the liquid can flow from the connection aperture 5 into the diaphragm and back.

Figure 2:
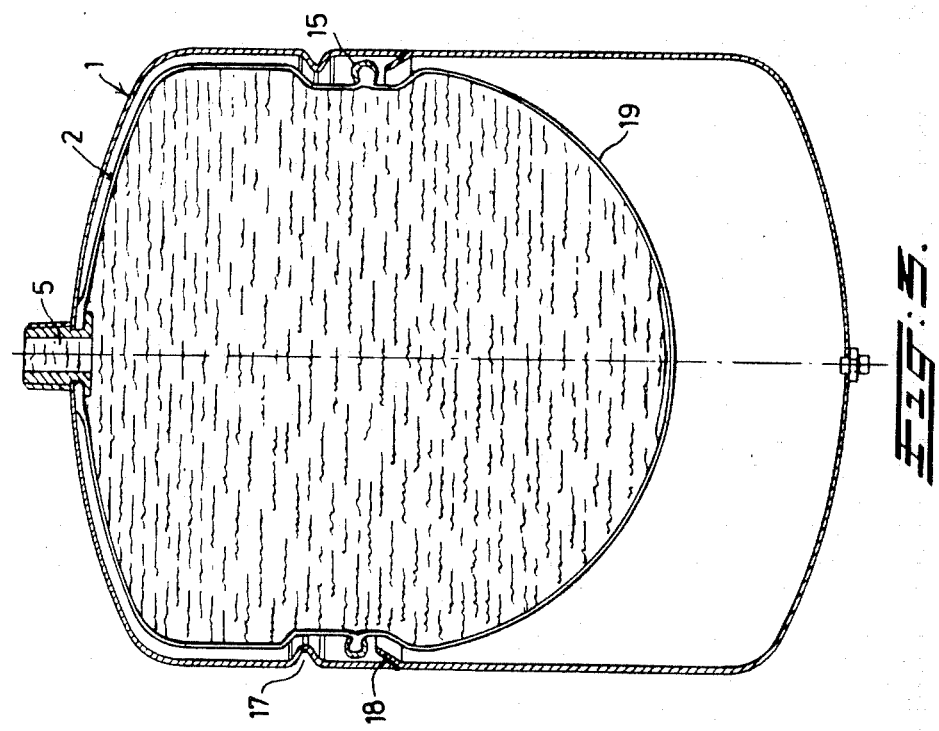
FIG. 2 is a cross section of the expansion tank of FIG. 1, with the diaphragm in the half-expanded state.
Figure 3:
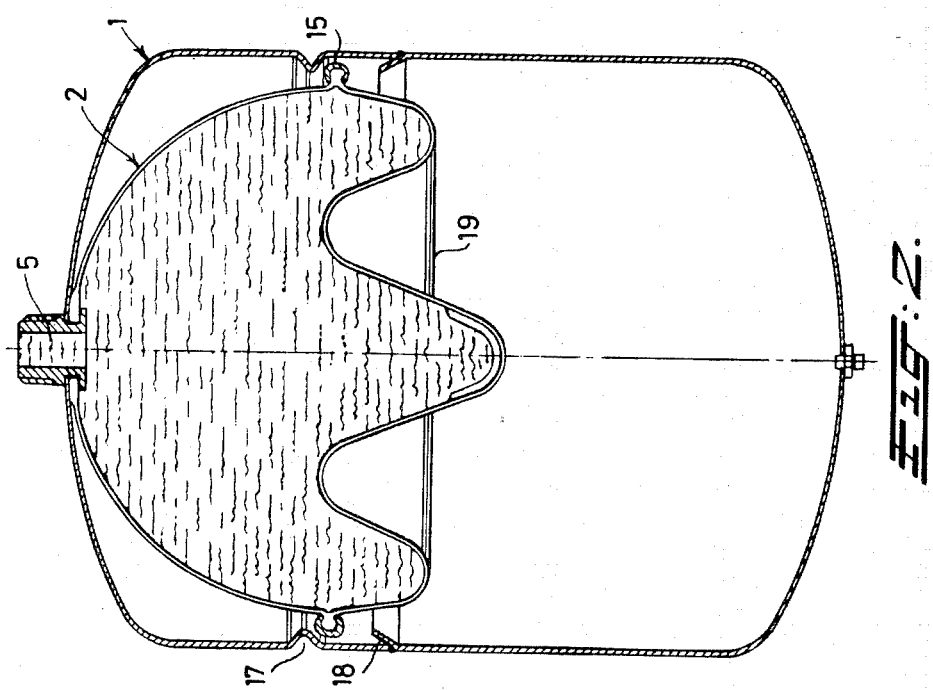
FIG. 3 is a cross section of the expansion tank of FIG. 1, with the diaphragm in the virtually fully expanded state.

FIGS. 2 and 3 show the position in which the diaphragm is partially and virtually fully expanded through inflowing liquid.

It can be seen from both figures that the movement of the ring is limited by the two ribs 17 and 18.

Figure 4:
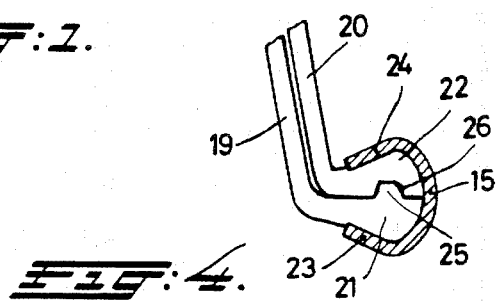
FIG. 4 is a cross section on an enlarged scale of the connecting seam of the two diaphragm parts with open-holding element according to detail IV in FIG. 1.

In the embodiment shown the diaphragm 2 is made up of two parts, i.e., a part 20 which extends between the ring 15 and the connecting nipple 6, and the earlier-mentioned part 19. The peripheral edges 21 and 22 of the two parts 19 and 20 are connected to each other in sealing fashion. In the embodiment shown (see also FIG. 4) the peripheral edges 21 and 22, which project to the outside, lie against each other and are clamped together by the ring 15, which in the embodiment shown are a U-shaped cross section. The edges 21 and 22 are accommodated in the peripheral U-shape and are clamped to each other by the legs 23 and 24 of the U-shaped ring. The legs 23 and 24 are bent towards each other, i.e., the free ends of the two legs extend towards one another, so that very good clamping is obtained.

The peripheral edges 21 and 22 of the diaphragm parts 19 and 20 can also be provided with meshing circumferential ribs 25 and recesses 26 in order to obtain a very reliable seal.

From the point of view of manufacture, making the diaphragm of two parts is very advantageous, since the manufacture of a one-piece bladder-type diaphragm with a small opening is very difficult.

As can be seen from the above description, the expansion tank according to the invention has two important advantages:

the bladder-shaped diaphragm cannot be pressed together in uncontrolled fashion and crumpled together, which is advantageous for the service life thereof; and the diaphragm is easy to manufacture.

What is claimed is:

1. An expansion tank which comprises
a generally cylindrical housing which has a side wall and opposite end walls, said generally cylindrical housing defining a center line therethrough and having a gas port and a liquid port,
a rigid clamping ring positioned inside of said generally cylindrical housing and movable along the side wall thereof, said rigid clamping ring including two generally radially inwardly-extending legs with free ends which provide the rigid clamping ring with a generally U-shaped cross section, and
first and second flexible bladder elements positioned inside of said generally cylindrical housing, each of said first and second flexible bladder elements having a peripheral edge, the peripheral edges of said first and second flexible bladder elements extending between the two legs of said rigid clamping ring so as to be sealingly clamped together, said first flexible bladder element being positioned between said liquid port and said second flexible bladder element and defining a mouth which is attached to said generally cylindrical housing so as to be in communication with said liquid port.

2. The expansion tank according to claim 1, wherein the free ends of said two legs of said clamping ring extend towards one another.

3. The expansion tank according to claim 1, wherein said side wall of said generally cylindrical housing includes inwardly-extending projections, said projections essentially lying in two spaced apart imaginary planes which extend essentially perpendicularly to said center line, and wherein said rigid clamping ring is positioned between said projections and is movable between said imaginary planes formed thereby.

4. The expansion tank according to claim 1, wherein said side wall of said generally cylindrical housing includes inwardly-extending circumferential ribs, said circumferential ribs essentially lying in two spaced apart imaginary planes which extend essentially perpendicularly to said center line, and wherein said rigid clamping ring is positioned between said circumferential ribs and is movable between said imaginary planes formed thereby.

* * * * *